United States Patent [19]
Upton

[11] Patent Number: 5,864,296
[45] Date of Patent: Jan. 26, 1999

[54] FINGERPRINT DETECTOR USING RIDGE RESISTANCE SENSOR

[75] Inventor: Eric L. Upton, Redondo Beach, Calif.

[73] Assignee: TRW Inc., Redondo Beach, Calif.

[21] Appl. No.: 858,836

[22] Filed: May 19, 1997

[51] Int. Cl.[6] .................................................. H04Q 1/00
[52] U.S. Cl. .................. 340/825.3; 340/825.31; 340/825.34; 382/124; 382/116; 382/125; 382/127; 178/18; 178/17 D; 345/173; 345/174; 345/179
[58] Field of Search ............................ 340/825.3, 825.31, 340/825.34; 382/124, 116, 125, 127; 178/18, 17 D; 345/173, 174, 179

[56] References Cited

U.S. PATENT DOCUMENTS

| | | | |
|---|---|---|---|
| 3,639,905 | 2/1972 | Yaida et al. | 340/825.34 |
| 3,781,855 | 12/1973 | Killen | 382/126 |
| 4,429,413 | 1/1984 | Edwards | 382/124 |
| 4,582,985 | 4/1986 | Lofberg | 340/825.34 |
| 4,784,484 | 11/1988 | Jensen | 382/124 |
| 4,983,036 | 1/1991 | Froelich | 382/124 |
| 5,079,949 | 1/1992 | Tamori | 73/172 |
| 5,088,817 | 2/1992 | Igaki et al. | 382/125 |
| 5,195,145 | 3/1993 | Backus et al. | 382/126 |
| 5,258,922 | 11/1993 | Grill | 382/124 |
| 5,267,324 | 11/1993 | Kumagai | 382/127 |
| 5,325,442 | 6/1994 | Knapp | 382/124 |
| 5,373,181 | 12/1994 | Scheiter et al. | 257/415 |
| 5,400,662 | 3/1995 | Tamori | 382/124 |
| 5,546,471 | 8/1996 | Merjanian | 382/124 |
| 5,559,504 | 9/1996 | Itsumi et al. | 340/825.3 |
| 5,745,046 | 4/1998 | Itsumi et al. | 340/825.31 |
| 5,757,278 | 5/1998 | Itsumi | 340/825.31 |

*Primary Examiner*—Michael Horabik
*Assistant Examiner*—Yves Dalencourt
*Attorney, Agent, or Firm*—Michael S. Yatsko

[57] ABSTRACT

A technique for detecting and verifying a fingerprint includes a skin resistance sensing array for translating the skin resistance of a fingertip into an electrical signal. The fingertip is moved relative to the skin resistance sensing array in a first linear direction for producing a reference trajectory signal which is stored into a memory. The fingertip is again moved relative to the skin resistance sensing array in a second linear direction for producing a sample trajectory signal. The second linear direction of movement is offset from the first linear direction of movement by a predetermined angle. A processor is provided for performing a set of functions on the reference trajectory signal and the sample trajectory signal. The sample trajectory signal is correlated with the reference trajectory signal for producing a verification signal related to the probability that the fingertip generated both the sample trajectory signal and the reference trajectory signal.

20 Claims, 7 Drawing Sheets

5,864,296

FINGERPRINT DETECTOR USING RIDGE RESISTANCE SENSOR

BACKGROUND OF THE INVENTION

1. Technical Field

The present invention relates to fingerprint detection devices, and more particularly to electronic fingerprint detection devices for sensing the unique surface topography of a fingerprint.

2. Discussion

Fingerprint detection devices are utilized in many applications requiring an extremely high probability of positive recognition of persons seeking access to secured areas, at customs and border inspections, and where it is essential to verify that the correct person is involved in the transaction. Other forms of identification have been implemented to verify the correctness of a specific person including photographic identification, signature verification, and personal identification numbers (PIN). Problematically, the latter of these schemes fail to uniquely identify an individual with the same level of assurance as an individual's fingerprints. All of the above-mentioned forms of identification are extremely susceptible to fraudulent modification. The likelihood of two sets of fingerprints being the same is so remote that law enforcement agencies use fingerprints with high confidence to positively identify individuals. Real time fingerprint detection devices have been implemented for high probability identification, but many limitations still exist. The associated costs currently make large scale distribution of these devices impossible.

Currently, fingerprint detection devices employ some form of imaging system to scan the unique characteristics of a fingerprint which are then compared to those same characteristics of a known reference fingerprint. Typically these imaging systems consist of thermal or optical sensors for translating fingerprint line information into digital wave forms that can be analyzed by a microprocessor. Further, these imaging components require complex optics, lasers or electronic circuits which are expensive to manufacture. Therefore the devices in which they operate are expensive and typically have limited portability. They also require complex image processors to implement the fingerprint detection algorithms. To operate these conventional devices, the fingerprint is placed upon the imaging surface, and remains stationary while the device electronically scans or optically images the fingerprint line characteristic information. This often involves arrays as large as 256×512 sensing elements making the integrated sensor expensive and vulnerable since it must come in contact with the finger. These complex arrays produce a large number of data points that must be processed and ultimately stored for reference. In addition they are highly susceptible to dirt and oils present within their operating environment. Some arrays also require a complicated registration system for detecting the position or relative center of the fingerprint and establishing reference points before scanning the fingertip and processing its characteristics against a known reference.

An exemplary approach is disclosed in U.S. Pat. No. 4,582,985 to Löfberg entitled "Data Carrier" which discloses a fingerprint verification system fabricated into a device approximately the size of a credit card. The device includes a memory used to store a previously obtained reference bit sequence. The fingerprint to be detected is placed upon an imaging device consisting of thermal or optical sensing elements for translating fingerprint line information into a digital bit sequence. The digital signal is then compared to a reference bit sequence by a microprocessor. If the comparison process achieves a match within a certain degree of coincidence, a positive detection signal is produced. However, as noted above, this approach accomplishes fingerprint verification by using a sensing array with a large number of sensing elements. This complex array is expensive to fabricate, produces large volumes of data to process, and is easily damaged by excessive force. It further requires a registration means for detecting the position of the stationary fingertip, thereby increasing the complexity of the circuitry and requiring additional data processing capabilities.

Thus it would be desirable to provide a fingerprint detector employing a sensing array with a small number of sensing elements, thereby simplifying the data processing requirements by reducing the quantity of data to be analyzed and lowering overall power consumption permitting battery operated devices. In addition, it would be desirable to provide a fingerprint detection device which utilizes an electronic sensor allowing the electronics to be implemented within a single integrated circuit to reduce cost and eliminate exotic imaging technologies. These features enable manufacturing a cost effective device for large scale implementation in both industrial and consumer applications. Furthermore, it is desirable to provide a sensor which produces an electronic signal with high signal-to-noise ratio and high dynamic range, thereby significantly reducing the probability of error.

SUMMARY OF THE INVENTION

Pursuant to the present invention, a low cost fingerprint detector using a skin resistance sensing array is disclosed. In accordance with the teachings of one embodiment of this invention, a fingerprint detector is provided which includes a skin resistance sensing array for translating skin resistance of a fingertip into a sample trajectory signal. The sample trajectory signal corresponds to conductance changes in the skin resistance which is a function of ridges and valleys of the fingertip, as it is moved across the sensing array surface. The sensing array includes at least one sensor positioned for contacting a fingertip and allowing relative movement between the fingertip and the sensor. The sensing array is coupled to a sampling circuit which translates the sample trajectory signal into a digital signal. The fingerprint detector further includes a processor to receive the digital sample trajectory signal, compare it with a reference trajectory signal and execute a verification algorithm.

Also in accordance with the teachings of this invention, a technique for detecting and verifying a fingerprint is disclosed. The fingertip is moved relative to the skin resistance sensing array in a first linear direction for producing a reference trajectory signal which is stored into a memory. The fingertip is again moved relative to the skin resistance sensing array in a second linear direction for producing a sample trajectory signal. The second linear direction of movement is offset from the first linear direction of movement by a predetermined angle. A processor is provided for performing a set of functions on the reference trajectory signal and the sample trajectory signal. The sample trajectory signal is correlated with the reference trajectory signal for producing a verification signal related to the probability that the fingertip generated both the sample trajectory signal and the reference trajectory signal.

BRIEF DESCRIPTION OF THE DRAWINGS

Other objectives and advantages of the present invention will become apparent to those skilled in the art upon reading the following detailed description and upon reference to the drawings, in which.

DETAILED DESCRIPTION OF THE PREFERRED EMBODIMENT

The following description of the preferred embodiment is merely exemplary in nature and is in no way intended to limit the invention or its application or uses.

The present invention is particularly concerned with a device for detecting and verifying a fingerprint using a ridge resistance sensing array along with a technique for moving a fingertip across the sensing array surface and processing the resulting electrical signal. The simplicity of the array along with the technique for swiping the finger across the array, allow for a low cost signal processing system to be implemented and fabricated into a single integrated circuit package. The resulting low cost chip may then be integrated into other devices such as, but not limited to, credit cards, door locks, point of sale terminals, and computer terminal keyboards, as a means for identification or security.

The invention is described in detail with reference to a fingerprint detection system integrated into a credit card which is intended to be illustrative of the concept. It will be appreciated by those skilled in the art that the present invention, as defined by the appended claims, has many other applications other than the illustrative embodiments. Furthermore, the invention is described with reference to the fingerprint detector being fabricated into a single integrated circuit, however, it will be appreciated by those skilled in the art that a fingerprint detector system assembled from discrete electronic components is within the scope of the present invention.

Figure 1:
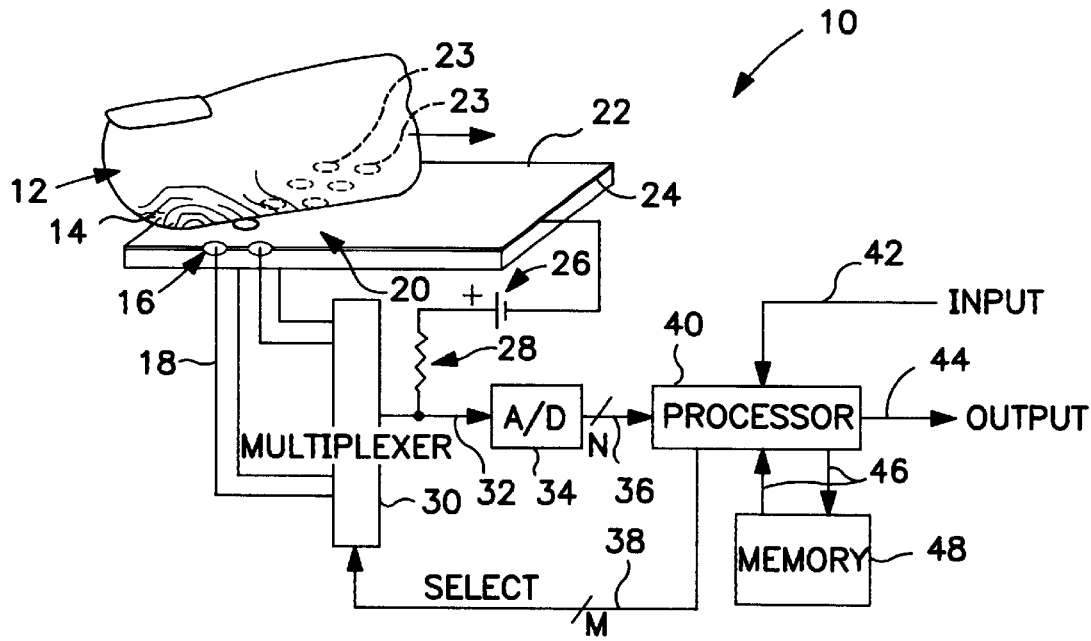
FIG. 1 is a functional schematic of the fingerprint detection system in accordance with the present invention.

Turning now to FIG. 1, a fingerprint detector 10 is shown by way of a functional schematic diagram. The fingerprint detector 10 includes a skin resistance sensing array 20 which further includes ten sensing elements 16 forming a 2×5 array. The sensing elements 16 are aligned as rows and columns. The rows are spaced at a predetermined distance, which allow a fingertip velocity function to be measured. Sensing array 20 is constructed by forming a conducting layer 22 upon an insulating layer 24 which may also serve as a supporting structure for the device. Additionally, conducting layer 22 and sensing elements 16 form the top surface of the skin resistance sensing array 20 across which the fingertip 12 is drawn. Conducting layer 22 also includes a plurality of holes 23 aligned in a 2×5 array. Each sensing element 16 is formed where a corresponding conducting layer hole 23 exposes an annular portion of the insulating layer 24 that in turn encompasses one conducting wire 18. These features can also be seen in FIG. 4. Each conducting wire 18 extends downwardly from the sensing element 16 surface, and into the insulating layer 24. The conducting wires 18 may extend completely through the insulating layer 24 and terminate at the input connections of multiplexer 30. In an alternative embodiment, conducting wires may form traces that extend through the insulating layer 24 which forms the integrated circuit (IC) packaging and connect to an integrated multiplexing circuit within the monolithic package. The traces may also run through the body of the data carrier card 50 before connecting to sampling circuit 56.

Figure 2:
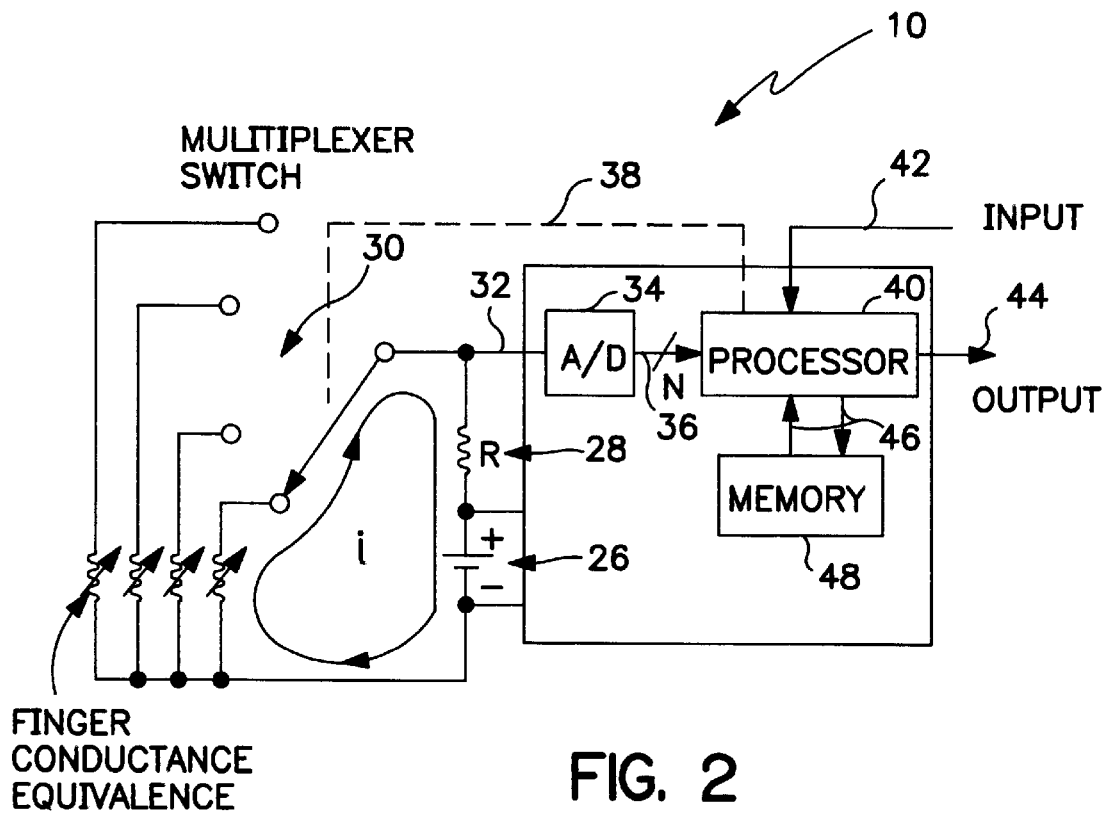
FIG. 2 is a schematic which illustrates an equivalent circuit of the fingerprint detection system.

As depicted in FIGS. 1 and 2 sensing array 20 further includes components that form a resistive voltage divider circuit. However it will become apparent to one skilled in the art that this circuit is not limited to a resistive voltage divider, and other circuits suitable for measuring the resistance characteristic of skin are embodied within the scope of the present invention. A first resistor 28 is connected to the positive terminal of a voltage supply 26. The negative terminal of the voltage supply 26 is connected to conducting layer 22. Each of the ten conducting wires 18 is connected to an input terminal of a multiplexer 30, which is modeled as a short circuit switching device (FIG. 2) which selectively completes the circuit through to first resistor 28. Referring to FIG. 2, the multiplexer 30 is then selectively switched by a processor 40 through select lines 38 in a continuous one through ten sequence. As can be most clearly seen in FIG. 4 the voltage divider circuit formed by the sensing array 20 is completed when a fingertip ridge 60 of fingerprint 14 forms a second variable resistor connecting conducting layer 22 with a conducting wire 18. Fingertip ridges 60 behave like variable resistors, and fingertip valleys 62 behave like open circuits.

The voltage drop across fingertip ridge 60 creates the sample trajectory signal, which represents the resistive characteristic of human skin. Each sample trajectory signal is produced by the continuous curvalinear trajectory formed by fingertip ridges 60 and valleys 62, as traced by a sensing element 16, and represents electrical conductance changes in the skin resistance of the fingertip 12. The resulting analog sample trajectory signal is sampled by analog to digital converter 34 at input 32 which translates the analog signal into a digital bit stream. The output of A/D converter 34 consists of N bit data lines 36 coupled to processor 40 which allow transmission of the digital sample trajectory signal. Processor 40 further includes verification output 44 for providing a verification signal. Processor 40 may optionally include a processor input 42 for allowing data transmission through data interface 54 from an external storage device. Input 42 allows for an externally stored reference trajectory signal to be received by processor 40 for real time comparison with the sample trajectory signal. Alternatively, if a data interface 54 is not provided, processor 40 may be directly coupled to a memory 48 through memory interface 46. Memory 48 is selectively programmable with the user's reference trajectory signal information. Memory 48 may be either a random access memory (RAM) or a read only memory (ROM).

Multiplexer 30 and A/D converter 34 along with their supporting components form sampling circuit 56 which may exist as discrete components, or may alternatively be combined into a monolithic integrated circuit package. Sampling circuit 56 currently exists as an industry standard product such as that manufactured by Maxim Corporation under part number MAX186AEWP. In the preferred embodiment, processor 40 is a digital signal processor (DSP) with the capability to perform statistical correlations of two or more digital signals. Processor 40 is currently available as an industry standard DSP manufactured by Texas Instruments as part of the TMS320 family of signal processors.

Figure 3:
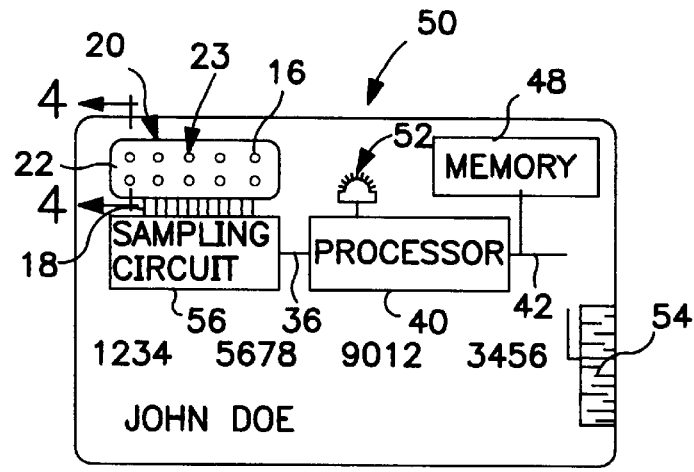
FIG. 3 is a schematic of the fingerprint detector fabricated into a data carrier card in accordance with the present invention.
Figure 7:
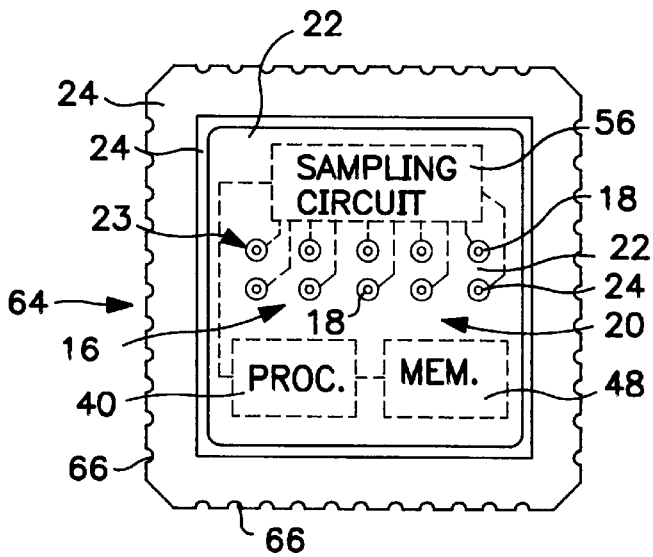
FIG. 7 illustrates the sensing array, sampling circuit, processor and memory fabricated into a single integrated circuit package with the array of conducting wires embedded into the top surface.
Figure 8:
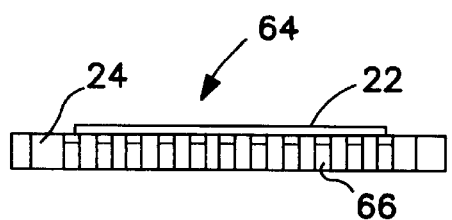
FIG. 8 illustrates a side view of the integrated circuit package of FIG. 7 with side mounted connecting wires.

Turning now to FIG. 3, an exemplary data carrier card 50 is depicted along with a functional block diagram of fingerprint detector 10. Sensing array 20 is flushly mounted within the surface of data carrier 50. Conducting layer 22 is formed upon the surface of sensing array 20 along with insulating layer 24 and conducting wires 18 flushly exposed at the surface. Conducting wires 18 extend from the surface of sensing array 20 down into the body of data carrier card 50 where they then connect to sampling circuit 56. In the preferred embodiment, sensing array 20, sampling circuit 56, processor 40, and optionally, memory 48 are integrated into a single integrated circuit package 64 as best illustrated in FIGS. 7 and 8. In the preferred embodiment, conducting wires 18 connect to sampling circuit 56 internally through IC package 64. Returning to FIG. 3, data carrier 50 further includes a verification transducer 52 connected to processor 40 which may produce either a visible or audible signal. The data carrier card 50 shown in FIG. 3 also includes an optional data interface 54. The functional block diagram illustrates sampling circuit 56 connected by data lines 36 to processor 40, which is further connected to memory 48. It should be noted that memory 48 and data interface 54 are optional elements. Data interface 54 is not required if fingerprint detector includes a memory 48. However, an alternative embodiment of data carrier 50 may include both a memory 48 and a data interface 54.

Figure 4:
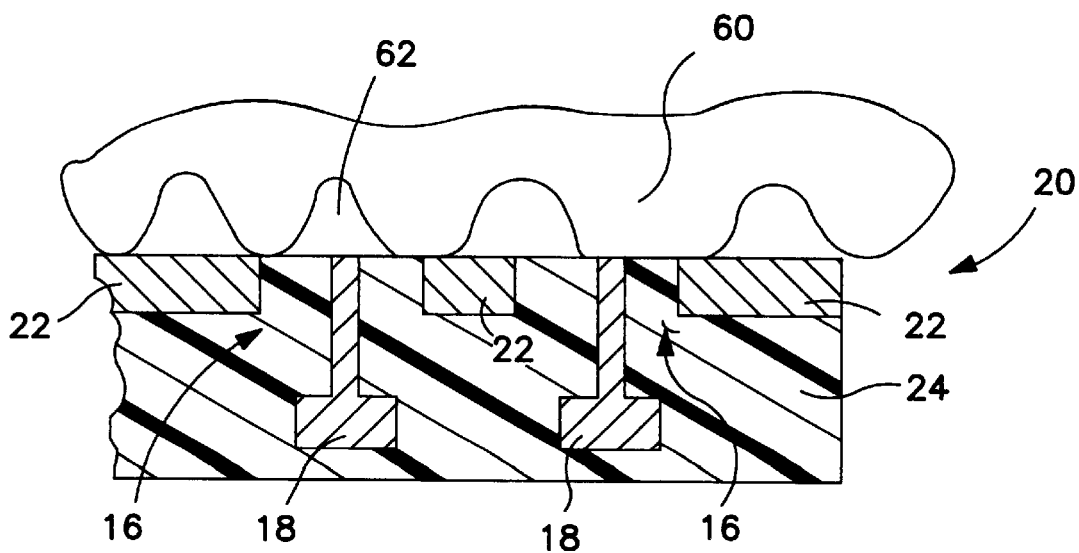
FIG. 4 is a sectional view of a representative skin resistance sensing array taken along line 4—4 of FIG. 3.

Turning now to FIG. 4, a cross-sectional view of sensing array 20 is taken along sectional 4—4. The figure illustrates insulating layer 24 with conducting layer 22 formed thereon. In this embodiment, insulating layer 24 may take the form of, but not limited to, the body of data carrier card 50 or the packaging material of an integrated circuit, so long as these materials possesses the requisite insulating qualities. It should be particularly noted that an annular portion of insulating layer 24 is exposed by conducting layer holes 23 at each sensing element 16 location. Conducting wires 18 are then fabricated into insulating layer 24 and extend flushly from each sensing element 16 surface down into insulating layer 24 where they connect to multiplexer 30. The figure illustrates that each conducting wire 18 is small enough in diameter that a fingertip valley 62 can pass over a conducting wire 18 without completing the circuit to conducting layer 22. However, each conducting wire 18 must also be large enough to contact a fingertip ridge 60 to complete a circuit through the ridge 60 to conducting layer 22.

Figure 5:
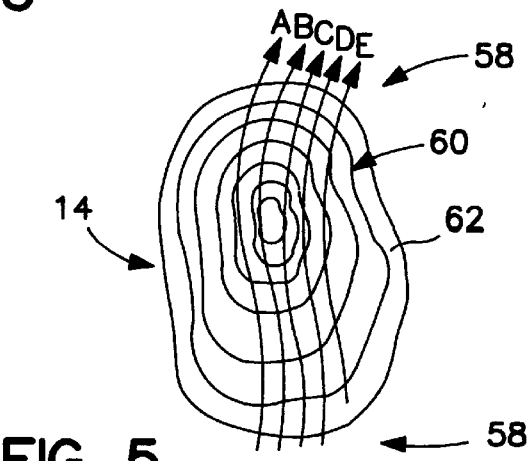
FIG. 5 illustrates a representative fingerprint and the arbitrary path or trajectory taken by a fingerprint being moved across five sensing elements.

Turning now to FIG. 5, an exemplary fingerprint 14 of a fingertip is depicted comprising fingertip ridges 60 and fingertip valleys 62. Also illustrated in this figure is an exemplary sensing array path 58 traced across a fingerprint 14 surface as fingertip 12 is drawn across the sensing array 20. Sensing array 20 may trace any path across fingerprint 14 so long as the path extends the full length of fingerprint 14 through the approximate center in a continuous manner. The path followed by each sensing element 16 along sensing array path 58 produces a sample trajectory signal representing the unique topography of the individual's fingertip.

Figure 6:
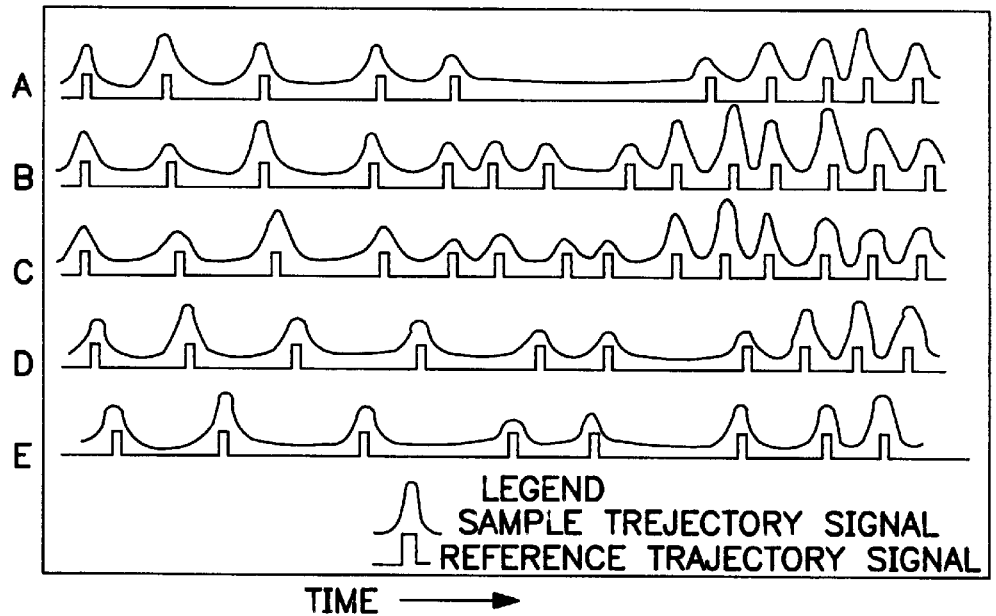
FIG. 6 is a graph of five sample trajectory signals (A–E) produced at each sensor output over time, representing the conductance changes between fingerprint ridges and valleys, and compared with positions of the reference fingerprint data if their respective functions were matched.

Turning now to FIG. 6, a graph illustrates five sample trajectory signals measured at each sensor element 16. The graph illustrates each sample trajectory signal which is defined as a continuous curvalinear voltage function measured over time. The graph further corresponds to the exemplary sensing array path 58 as depicted in FIG. 5. Each sample trajectory signal A through E on FIG. 6 directly corresponds to a sensing array path 58 line A through E as illustrated in FIG. 5. It should be noted that each peak within the sample trajectory signals A through E graphed in FIG. 6 represents a fingertip ridge 60 as the ridge 60 completes a circuit through each sensing element 16. The sample trajectory signal is quantized into a digital signal, and correlated with the stored reference trajectory signal. The graph also illustrates five reference trajectory signals with fingertip ridge 60 positions that match those of the sample trajectory signals. Comparing FIG. 5 with FIG. 6, it should be noted that the intersection of each fingerprint ridge 60 with each sensing array path 58 line A through E (FIG. 5) as each of the five sensing elements 16 is drawn in the direction of the arrows across fingerprint 14 directly correspond to the sample trajectory signal peaks graphed over time as illustrated in FIG. 6.

Referring now to FIG. 7, a complete fingerprint detector 10 is disclosed as fabricated into a single integrated circuit package 64. The chip is preferably small enough to further allow integration into a data carrier card 50. The primary dimension of concern is the thickness of the chip packaging. A variety of monolithic integrated circuits are available in this standard C2 Package-44 Contact Hermetic Ceramic Chip Carrier available from TRW Inc. The standard package illustrated can be manufactured to a minimum thickness of 1.62 mm, however, future advances in manufacturing technology will likely allow this dimension to be reduced. FIG. 7 is a top view of integrated circuit package 64 which is typically manufactured from ceramic, epoxy resin, or a similar material which is suitable as an insulating layer 24. Conducting layer 22 is formed on the top surface of insulating layer 24, which then becomes part of IC package 64. Conducting layer holes 23 are formed at each predetermined sensing element 16 location to expose a conducting wire 18 as well as an annular section of insulating layer 24 that surrounds each conducting wire 18. The figure further indicates the importance of each conducting layer hole 23 centered around its respective conducting wire 18 which creates an insulating region formed by the exposed insulating layer 24 between the conducting layer 22 and the conducting wire 18. Each conducting wire 18 is exposed at the surface of integrated circuit package 64 and extends down through the packaging to connect with sampling circuit 56. In addition, FIG. 7 illustrates integrated circuit package 64 and a block diagram of the functions contained within the monolithic circuit. The low complexity of sensing array 20 is the primary feature which allows fingerprint detector 10 to be fabricated into a single monolithic chip.

FIG. 8 is a side view of integrated circuit package 64. It can also be seen from this illustration that conducting layer 22 is formed upon insulating layer 24 which further serves as the primary packaging material. The figure illustrates the positioning of connection pins 66 along the sides of IC package 64 which allow connection between the chip and external circuitry. It should be particularly noted that side mounted connection pins 66 further allow integrated circuit package 64 to maintain a low profile.

The method for detecting and verifying a fingerprint according to the teachings of this invention will now be described. An algorithm provides the decision as to whether the user's fingerprint data matches the stored reference data. The technique includes providing a fingerprint detector 10 with an exposed skin resistance sensing array 20 which allows the fingerprint 14 of fingertip 12 to be drawn in contact across sensing array 20 in a continuous manner. Immediately upon sensing contact of the fingertip 12 with the sensing array 20, the circuitry within the fingerprint detector 10 is automatically activated. It will be appreciated by one skilled in the art that automatic activation may be achieved by sensing surface pressure or electrical current through the device. The sensing array path 58 in which sensing array 20 is traced across the surface of fingerprint 14 is not dependent upon the alignment or rate in which fingerprint 14 is drawn across the sensing array 20. The only requirement for producing an acceptable sample trajectory signal is that fingerprint 14 must be drawn across sensing array 20 from end to end through the relative center of the fingerprint in a smooth continuous motion. The continuous motion of fingerprint 14 across sensing array 20 produces a continuous sample trajectory signal, as illustrated in FIG. 6. The resulting signal is typically of high signal-to-noise ratio and also covers a broad dynamic range. Both of these signal characteristics significantly reduce the probability of error contained within the statistical correlation algorithm. The analog sample trajectory signal is then quantized into a digital bit stream by A/D converter 34 (FIG. 1) that can be statistically correlated with a stored reference trajectory signal that is a record of the individual's fingertip ridges and valleys, by a digital signal processor 40 (FIG. 6). Monolithic digital signal processors that perform the necessary statistical correlation algorithm are currently available as standard off the shelf devices. The flexible architecture allows the reference trajectory signal to be stored in a memory 48, preferably a read only memory (ROM). Alternatively, the reference trajectory signal may be retrieved from an external storage device through data interface 54 before being processed.

The algorithm is flexible in that it allows the two signals to be compared in real time by the processor 40, or the digital bit stream representing the sample trajectory signal can be completely stored in a memory 48 and processed off-line by the processor 40. The algorithm executed by the processor seeks to maintain a minimum position hypothesis error between the sample trajectory signal and the reference trajectory signal. A statistical correlation is performed over all hypothetical degrees of freedom relative to the last stored reference trajectory signal value while the sample trajectory signal is obtained which establishes an aggregate error. The algorithm continues processing sample trajectory signal data against the stored reference data as long as the correlation algorithm can maintain a continuously low aggregate error. If the aggregate error calculated by the correlation algorithm exceeds a predetermined threshold error level, the processor 40 will terminate the detection algorithm, and provide a negative verification signal. If however, the statistical correlation algorithm can maintain a continuously low aggregate error level from beginning to end of the sample trajectory signal, the processor 40 will produce a positive verification signal indicating that the same fingertip produced both the sample trajectory signal and the reference trajectory signal.

The method of detection and verification further comprises a technique for normalizing the sample trajectory signal. It will be apparent to one skilled in the art that normalizing the sample trajectory signal reduces the complexity of the device by providing a continuously optimized number of sampled data points. The normalization technique is achieved by standardizing the optimal number of data points required, and providing an initial sampling rate. Upon detecting a sample trajectory signal, the processing algorithm calculates the sample trajectory signal frequency. It will be apparent to one skilled in the art that the sampling rate must be corrected by the processing algorithm in direct proportion to the sample trajectory signal frequency. Therefore, an increase in fingertip velocity across the sensing array 20 will cause a proportional increase in the sampling rate. Likewise, a decrease in fingertip velocity will cause a proportional decrease in the sampling rate. The normalization process further simplifies the disclosed invention by constantly providing an optimized number of data points, and further providing a fingerprint detection and verification method that becomes independent of the fingertip velocity. The reduced number of sampled data points facilitates implementation of a lower cost processing circuit, as well as a smaller amount of required memory and power to drive the circuit.

The preferred embodiment of the present invention is not dependent upon a memory 48 for storing the reference trajectory signal. Storage of the reference trajectory signal within the data carrier card 50 is an optional feature. Another embodiment of the current invention is a method by which the reference trajectory signal is provided to the processor 40 through a data interface 54. This embodiment allows the reference signal used by the correlation algorithm to be stored by the verifying agency, rather than storing the reference signal within the data carrier card 50. This feature serves to eliminate the element of fraud caused by a user carrying a counterfeit data carrier card 50. This feature would be especially useful to institutions such as, but not limited to, banks, health care facilities, and government agencies, that require the identification of a limited but known group of individuals. Where identification for security purposes allows a lower probability of absolute identification, data carrier card 50 may embody a credit card issued by a bank with the owner's reference trajectory signal pre-programmed within the memory 48. A credit card of this type could be presented by the owner when purchasing goods at retail establishments as a means for correctly identifying the card holder by verifying the fingerprint information at the point of sale terminal as a condition of the sale. The use of a data carrier card 50 which requires the user to verify their fingerprint prior to completing a sales transaction will significantly lower the occurrence of credit card fraud.

The unique features of the present invention allow a low cost fingerprint detector 10 to be implemented into a single integrated circuit package 64 which has a small overall size and low profile, further enabling the fingerprint detector 10 to be fabricated into a data carrier card 50, or other suitable device. These packages will be resistant to the harsh environments that human interfacing will produce. The unique skin resistance sensing array 20 has several advantages over existing technology which requires thermal or optical fingerprint detection schemes. The sensor produces an electronic waveform that may be processed by a relatively simple algorithm implemented using existing technology based upon the probability that any two fingerprints producing the same electronic signal is de minimis. Previously disclosed methods do not involve the technique of moving or swiping the fingertip relative to a sensing array, thereby producing a continuous electronic trajectory signal representing the fingerprint topography. Previously disclosed approaches further fail to provide a low cost sensing array for sensing electrical conductance changes of the varying resistance of ridges and valleys of a fingertip and translating this resistance characteristic of skin into an electrical signal.

Figure 9:
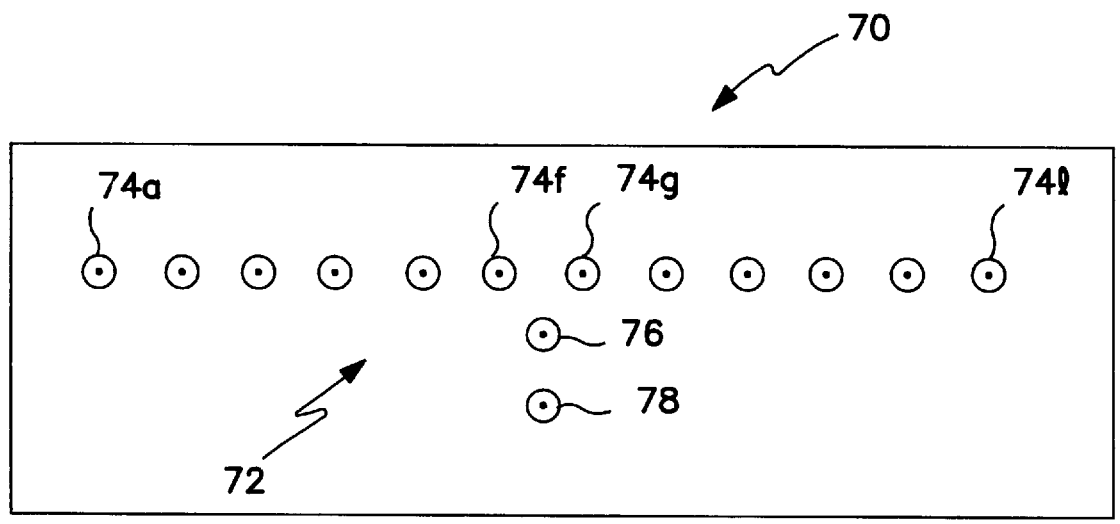
FIG. 9 is a top view of a representative skin resistance sensing array in accordance with the preferred embodiment of the present invention.

Referring now to FIG. 9, a modified sensing array 70 associated with an alternative preferred embodiment of the present invention is shown. Skin resistance sensing array 70 is similar to the sensing array 20 described above. The only significant differences are that skin resistance sensing array 70 comprises a total of fourteen sensing elements 72, and that these sensing elements 72 are arranged in a slightly different pattern. More particularly, sensing array 70 includes a single row of twelve sensing elements 74a–74l which primarily function to produce the twelve individual sample trajectory signals used for verification, and a column of two sensing elements 76 and 78 which are primarily intended to produce sample trajectory signals used for measuring a velocity function used by the verification algorithm.

Thus, sensing elements 74a–74l form a 1×12 array of skin resistance sensing elements. As disclosed, each sensing element 72 is 10 mils in diameter, and the elements of the array are spaced 30 mils apart. Preferably, sensing elements 76 and 78 are positioned below and between sensing elements 74f and 74g to measure the velocity function of the fingertip at the center of sensing array 70. However, one skilled in the art will appreciate that sensing elements 76 and 78 can be placed in various other positions for measuring the velocity function of the fingertip 12 without deviating from the scope of the present invention.

As described above, each of the twelve sensing elements 74a–74l of sensing array 70 produces a unique sample trajectory signal of the resistance values of the fingerprint ridges 60 and fingerprint valleys 62 as the fingertip 12 is moved relative to the sensing array 70. The twelve sample trajectory signals are acquired by a similar sampling and processing circuit 10 as best illustrated by FIG. 2. As described above, the twelve sample trajectory signals are correlated with twelve previously acquired reference trajectory signals to determine or verify statistically if the sample signals and reference signals were acquired from the same fingertip.

Figure 10:
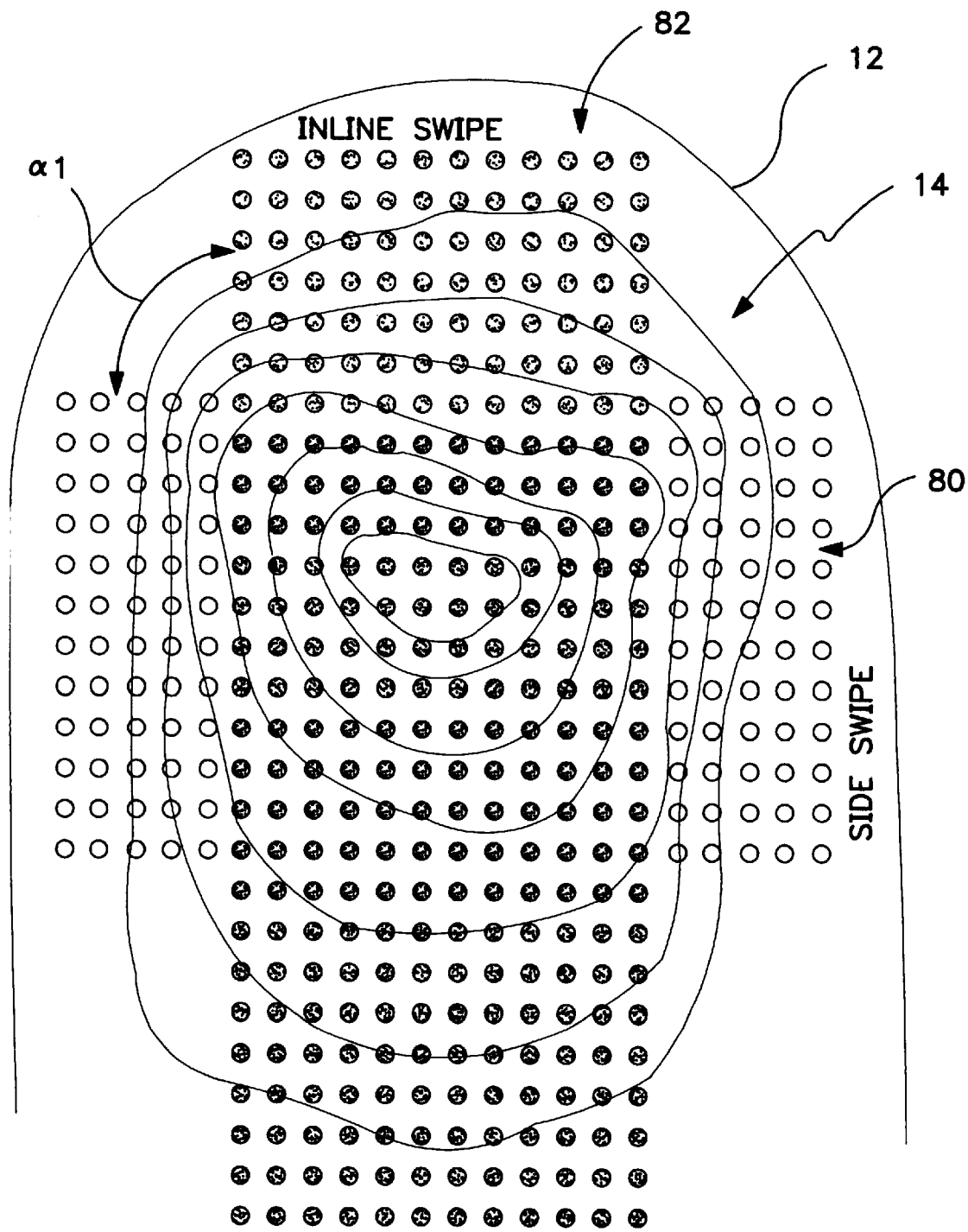
FIG. 10 is a functional diagram showing an exemplary fingerprint laid over a set of sample and reference data points.
Figure 11:
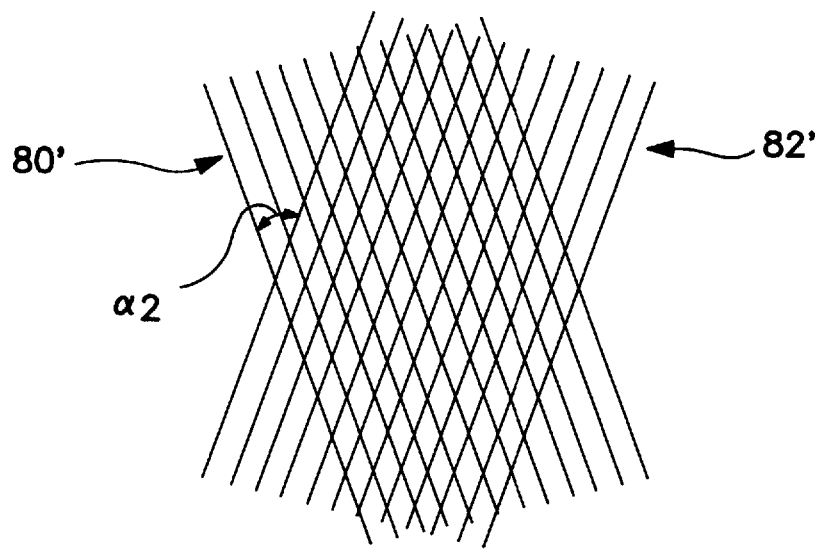
FIG. 11 is a functional diagram showing two swipes at acute angles to one another in accordance with an alternate embodiment of the present invention.

Referring now to FIG. 10, the data acquisition technique of the present invention is described in more detail. The particularly interesting feature associated with this alternative preferred embodiment is the unique method for acquiring and processing the sample and reference trajectory signals. Rather than swiping the fingertip 12 in the same direction when acquiring the sample and reference trajectory signals, the method of the present invention discloses acquiring the reference trajectory signal in a first side swipe direction 80. While it is preferred that this first side swipe 80 for producing the reference trajectory signal trace a straight line following the latitudinal direction of the fingertip 12, this angle is not critical so long as the swipe 80 follows a generally straight line. The second inline swipe 82, which produces the subsequent sample trajectory signal, is also taken along a straight line at an angle $\alpha_1$ which is offset from the angle of the reference swipe 80. Preferably, the angle $\alpha_1$ between the swiping paths 80, 82 producing the reference and sample trajectory signals is 90°. However, any acute angle between the swiping paths 80, 82 of the reference and sample trajectory signals will produce the desired set of intersecting data points. Accordingly, FIG. 11 depicts the acute angle $\alpha_2$ between the direction of the reference fingertip swipe 80' and the sample fingertip swipe 82'.

The goal of the present method is to force a minimized set of data for comparison by the processor 40. Accordingly, the preferred 90° angle between the paths 80, 82 of the reference and sample signals will force a matrix of intersecting data points which is automatically minimized to a total of 144 data points. These 144 data points are then processed by the correlation algorithm to verify that the sample and reference trajectory signals came from the same fingerprint.

Referring back to FIG. 9, the secondary sensing elements 76 and 78 are used to measure the velocity of the fingertip 12 as it is moved across the sensing array surface 70. Each velocity sensor 76 and 78 produces a sample trajectory signal representing the ridge resistance values of the fingerprint 14. Under ideal conditions, each sensor 76 and 78 would produce identical sample trajectory signals which differ only in time and are thus phase shifted. The signals produced by sensors 76 and 78 can then be processed by phase detection to calculate a velocity function of the fingertip moving relative to the sensing array 70.

Figure 12:
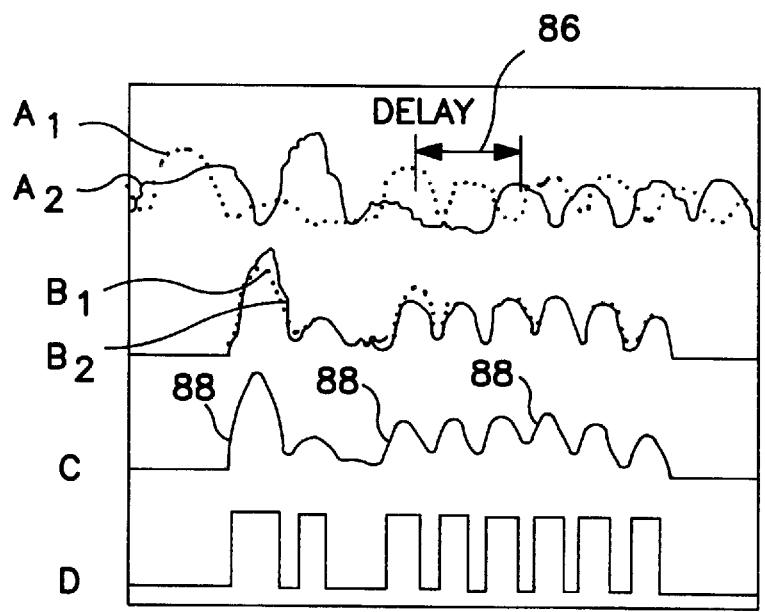
FIG. 12 is a graph of six trajectory signals shown during various stages of the signal processing.

More specifically, this velocity function computation is illustrated in FIG. 12. The waveforms depicted in FIG. 12 are labeled A–D for individual identification. Waveforms $A_1$ and $A_2$ show the trajectory signals produced by sensors 76 and 78, and waveforms $B_1$ and $B_2$ show the trajectory signals produced by sensors 76 and 78 after they have been normalized by the processing algorithm. After detecting both of these sample trajectory signals, the amount of delay 86 between the peaks of corresponding fingerprint ridges 60 can be computed. This delay 86 is represented above waveforms $A_1$ and $A_2$. The signals are then correlated and filtered to remove higher frequency contact noise. The velocity-normalized signal with the high frequency noise removed is depicted as waveform C. Finally, waveform D represents the resulting signal after the ridge edges 88 are extracted from the filtered signal using derivatives. This resulting velocity function signal represented by waveform D can then be used by the verification algorithm which correlates and compares the twelve sample trajectory signals to the twelve orthogonal reference trajectory signals.

Figure 13:
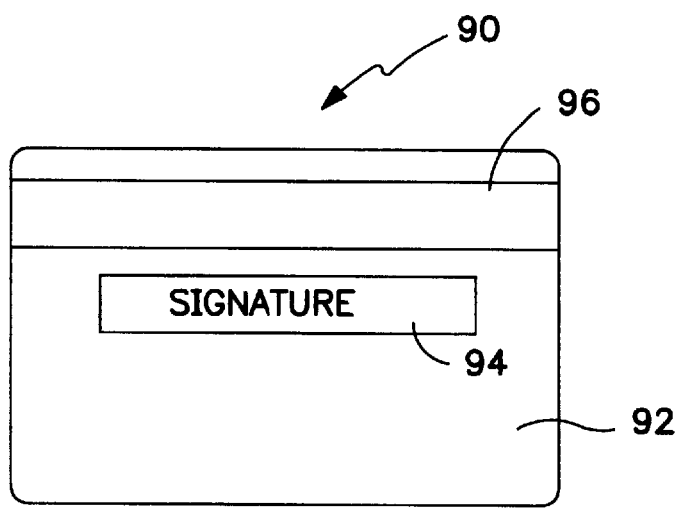
FIG. 13 is a diagram of an exemplary credit card having a magnetic strip for storing data in accordance with a preferred embodiment of the present invention.

The method of the present invention can be implemented in a variety of ways and still provide extremely reliable and accurate fingerprint verification. An exemplary implementation of the present method is described as follows. A simple fingerprint verification system 10, employing sensing array 70 is integrated into the point-of-sale terminal equipment at a retail establishment. If this retail establishment is a department store, then every point-of-sale register will be equipped with the verification system. The customers of the store will be issued a credit card identified with the customer's name and credit account number. FIG. 13 depicts an exemplary credit card 90. Like nearly all credit cards, the back side 92 of the card 90 includes a permanent signature area 94 and a magnetic strip 96 to which information such as name and account number may be encoded.

Before the customer may be allowed to use the credit or charge card 90, the customer must sign the card 90 in signature area 94 and have their fingerprint information from one fingertip 12 acquired and encoded on the magnetic strip 96 of the card 90, along with the customer's name and account number. This is accomplished by the customer swiping their fingertip 12 across sensing array 70 in a first side swipe direction 80 or 80', which produces a reference trajectory signal. This reference trajectory signal is then processed by the appropriate algorithms programmed into the point-of-sale terminal equipment. Once processed, the reference trajectory signal information is encoded onto the magnetic strip 96 of the credit card 90 by moving the magnetic strip 96 through the reader/encoder of the terminal equipment. Once the credit card 90 has been properly "activated" with the reference trajectory signal information, the customer is allowed to use the card 90 to purchase various goods and services from the store. Known or future encryption techniques can be employed to prevent unauthorized use or modification of the reference signal information stored on the magnetic strip 96, or to prevent other forms of fraudulent tampering.

When the customer desires to make a purchase at the store, the card 90 is presented to the clerk at the point-of-sale terminal. To initiate the customer verification process, the clerk runs the magnetic strip 96 on the back of the card 90 through the appropriate reader on the terminal so that the encoded reference trajectory signal information can be read into the terminal. Next, the customer is asked to swipe their fingertip 12 across sensing array 70 along a path 82 or 82' which is offset from the original path 80 or 80' of the reference signal by 90° or less. For example, if the reference trajectory signal was acquired along a latitudinal or transverse path 80 (FIG. 10) from right to left across the fingerprint 14, the subsequent sample trajectory signal would be taken along a longitudinal or bottom to top path 82 (FIG. 10) across the fingerprint 14. As the ridges 60 and valleys 62 of the fingertip 12 are swiped over the twelve sensing elements 74a–74l, sensing array 70 produces twelve sample trajectory signals which are then sampled, processed, and compared to the reference signal data read from the card 90 as previously disclosed.

Figure 14:
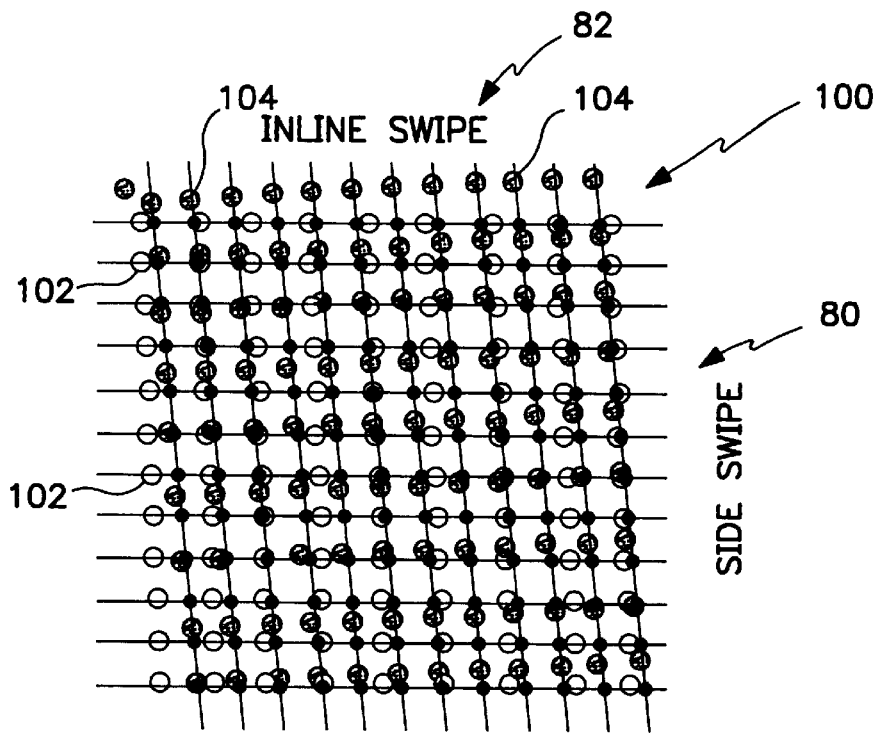
FIG. 14 is a functional diagram showing an exemplary intersection matrix laid over the data points from a reference trajectory signal and a sample trajectory signal.
Figure 15:
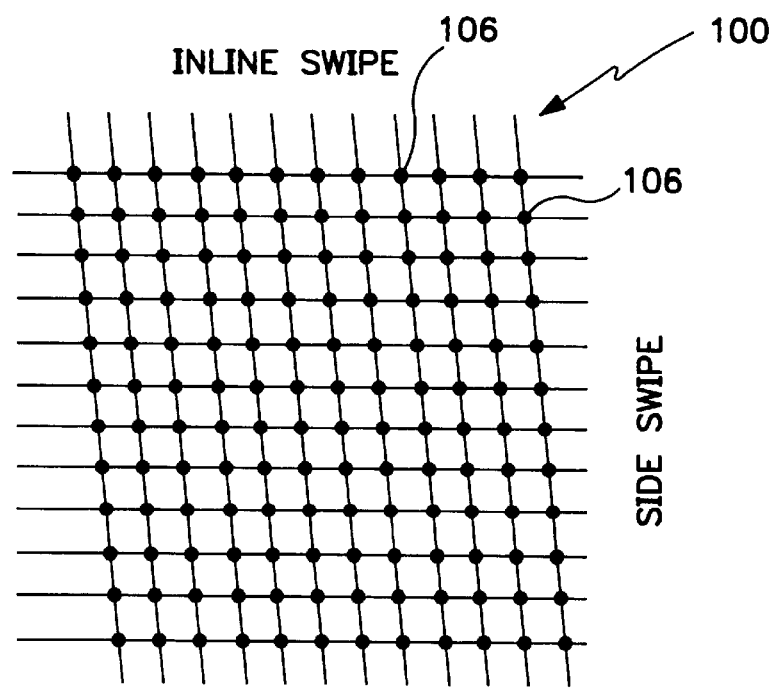
FIG. 15 is a functional diagram showing the resulting intersection matrix used for processing the reference and sample signal data.

With reference to FIGS. 14 and 15, the intersection matrix 100 associated with the present invention is disclosed. More specifically, the combination of the reference data points 102 and the sample data points 104 produce a data set, or matrix 100 of intersecting data points 106 representing the topography of the fingertip 12. The resulting intersecting data points 106 resulting from the reference and sample data points 102, 104 produced by the swipes 80, 82 should ideally have 144 points of equality, and this unique distinction will qualify the credit card possessor as the true owner of that card 90. Accordingly, the point-of-sale terminal performs a comparison of the reference and sample data points 102, 104 to verify that the same fingerprint 14 produced both the sample and reference signals. The verification algorithm implements a cross-correlation matched filter to statistically compare the signals. As such, if a preset statistical threshold is exceeded, the signals match, and the customer is then authorized to complete the purchase of goods or services. If the statistical threshold is not met, the signals are rejected, and the customer is not allowed to complete the purchase unless they can otherwise prove that they are the true owner of the credit card. Thus, it can be appreciated that the detection and verification algorithm must have an accuracy rate which exceeds 99% to achieve widespread acceptance by both customers and retail establishments.

While the preceding example represents the preferred implementation of the present invention, one skilled in the art will readily recognize that the present invention has many implementations. For example, the present invention could also be widely used by government agencies to verify the correct recipient of entitlement benefits. The sensor of the present invention could also be integrated into handguns owned by police officers so that their gun cannot be used against them or against others by an unauthorized user. Additionally, the present invention can be used by automobile manufacturers to prevent automobile theft, or unauthorized use of an automobile having a fingerprint verification system defined by the present invention installed therein. Before starting the automobile, the operator would be required to swipe their fingerprint across sensing array 70 to produce a sample trajectory signal. Once properly verified, as described above, the automobile could be started and driven by the authorized operator.

Although the invention has been described with particular reference to certain preferred embodiments thereof, variations and modifications can be effected within the spirit and scope of the following claims.

What is claimed is:

1. A method for detecting and verifying a fingerprint comprising the steps of:

providing a skin resistance sensing array, the skin resistance sensing array translating skin resistance of a fingertip into an electrical signal;

moving the fingertip relative to the skin resistance sensing array in a first linear direction for producing a reference trajectory signal;

storing the reference trajectory signal in a memory;

moving the fingertip relative to the skin resistance sensing array in a second linear direction for producing a sample trajectory signal, the second linear direction being offset from the first linear direction by a predetermined angle;

providing a processor for performing a set of functions on the reference trajectory signal and the sample trajectory signal;

correlating the sample trajectory signal with the reference trajectory signal; and producing a verification signal related to the probability that the fingertip generated both the sample trajectory signal and the reference trajectory signal.

2. The method of claim 1 wherein the predetermined angle of offset between the first linear direction and the second linear direction is an acute angle.

3. The method of claim 1 wherein the predetermined angle of offset between the first linear direction and the second linear direction is 90 degrees.

4. The method of claim 1 wherein the skin resistance sensing array includes a plurality of sensing elements.

5. The method of claim 1 wherein the skin resistance sensing array includes twelve sensing elements for producing the skin resistance trajectory signals for processing by a verification algorithm.

6. The method of claim 5 wherein the skin resistance sensing array includes two sensing elements for generating a velocity function.

7. The method of claim 1 wherein the set of functions includes generating an intersection matrix of common data points relating to the reference trajectory signal and the sample trajectory signal.

8. The method of claim 7 wherein the step of correlating the signals includes correlating the common data points of the sample trajectory signal with the reference trajectory signal.

9. The method of claim 8 wherein the step of correlating the signals includes performing a matched filter algorithm.

10. A method for detecting and verifying a fingerprint comprising the steps of:

provyding a fingerprint verification terminal;

providing a skin resistance sensing array coupled to the fingerprint verification terminal, the skin resistance sensing array translating skin resistance of a fingertip into an electrical signal;

moving the fingertip relative to the skin resistance sensing array in a first linear direction for producing a reference trajectory signal;

encoding the reference trajectory signal onto a data carrier card;

moving the fingertip relative to the skin resistance sensing array in a second linear direction for producing a sample trajectory signal, the second linear direction being offset from the first linear direction by a predetermined angle;

reading the reference trajectory signal from the data carrier card into a memory;

providing a processor for performing a set of functions on the reference trajectory signal and the sample trajectory signal;

correlating the sample trajectory signal with the reference trajectory signal; and producing a verification signal related to the probability that the fingertip generated both the sample trajectory signal and the reference trajectory signal.

11. The method of claim 10 wherein the predetermined angle of offset between the first linear direction and the second linear direction is an acute angle.

12. The method of claim 10 wherein the predetermined angle of offset between the first linear direction and the second linear direction is 90 degrees.

13. The method of claim 10 wherein the skin resistance sensing array includes a plurality of sensing elements.

14. The method of claim 10 wherein the skin resistance sensing array includes twelve sensing elements for producing the skin resistance trajectory signals for use by a verification algorithm.

15. The method of claim 14 wherein the skin resistance sensing array includes two sensing elements for generating a velocity function.

16. A method for detecting and verifying a fingerprint comprising the steps of:

providing a skin resistance sensing array, the skin resistance sensing array translating skin resistance of a fingertip into an electrical signal, and further including a plurality of sensing elements, at least two of the sensing elements being used for generating a velocity function;

moving the fingertip relative to the skin resistance sensing array in a first linear direction for producing a reference trajectory signal;

storing the reference trajectory signal in a memory;

moving the fingertip relative to the skin resistance sensing array in a second linear direction for producing a sample trajectory signal, the second linear direction being offset from the first linear direction by a predetermined angle;

providing a processor for generating an intersection matrix of common data points relating to the reference trajectory signal and the sample trajectory signal;

correlating the common data points of the sample trajectory signal with the reference trajectory signal; and producing a verification signal related to the probability that the fingertip generated both the sample trajectory signal and the reference trajectory signal.

17. The method of claim 16 wherein the predetermined angle of offset between the first linear direction and the second linear direction is an acute angle.

18. The method of claim 16 wherein the predetermined angle of offset between the first linear direction and the second linear direction is 90 degrees.

19. The method of claim 16 wherein the skin resistance sensing array includes twelve sensing elements for producing the skin resistance trajectory signals for processing by a verification algorithm.

20. The method of claim 16 wherein the step of correlating the signals includes performing a matched filter algorithm.

* * * * *